(12) United States Patent
Wu et al.

(10) Patent No.: US 9,363,499 B2
(45) Date of Patent: Jun. 7, 2016

(54) METHOD, ELECTRONIC DEVICE AND MEDIUM FOR ADJUSTING DEPTH VALUES

(71) Applicant: HTC Corporation, Taoyuan County (TW)

(72) Inventors: Jing-Lung Wu, Taoyuan County (TW); Pol-Lin Tai, Taoyuan County (TW); Hsin-Ti Chueh, Taoyuan County (TW); Yi-Hsuan Feng, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 49 days.

(21) Appl. No.: 14/316,797

(22) Filed: Jun. 27, 2014

(65) Prior Publication Data

US 2015/0139533 A1     May 21, 2015

Related U.S. Application Data

(60) Provisional application No. 61/904,467, filed on Nov. 15, 2013.

(51) Int. Cl.
| | | |
|---|---|---|
| *G06K 9/00* | (2006.01) | |
| *H04N 13/00* | (2006.01) | |
| *H04N 5/232* | (2006.01) | |
| *G06K 9/32* | (2006.01) | |

(52) U.S. Cl.
CPC ........ *H04N 13/0022* (2013.01); *G06K 9/00362* (2013.01); *G06K 9/3233* (2013.01); *H04N 5/23216* (2013.01); *H04N 13/0018* (2013.01)

(58) Field of Classification Search
CPC .................................................. H04N 13/0022
USPC .......................... 382/106, 154, 162, 199, 266
See application file for complete search history.

(56) References Cited

U.S. PATENT DOCUMENTS

| | | | | |
|---|---|---|---|---|
| 2002/0145757 | A1* | 10/2002 | Fedorovskaya et al. | 358/3.1 |
| 2009/0095880 | A1* | 4/2009 | Otsuki | 250/201.2 |
| 2011/0110585 | A1* | 5/2011 | Kang et al. | 382/164 |
| 2011/0115886 | A1* | 5/2011 | Nguyen et al. | 348/47 |
| 2012/0274634 | A1* | 11/2012 | Yamada et al. | 345/419 |
| 2013/0170736 | A1* | 7/2013 | Guo et al. | 382/154 |
| 2014/0002595 | A1* | 1/2014 | Po et al. | 348/43 |
| 2014/0015830 | A1* | 1/2014 | Hong et al. | 345/419 |
| 2014/0043522 | A1* | 2/2014 | Hamano | 348/349 |
| 2015/0071526 | A1* | 3/2015 | Nguyen et al. | 382/154 |

FOREIGN PATENT DOCUMENTS

| | | |
|---|---|---|
| CN | 101299268 | 11/2008 |
| CN | 102663722 | 9/2012 |

OTHER PUBLICATIONS

"Office Action of Taiwan Counterpart Application", issued on Oct. 2, 2015, p. 1-p. 5.

* cited by examiner

*Primary Examiner* — John Strege
(74) *Attorney, Agent, or Firm* — Jianq Chyun IP Office

(57) ABSTRACT

A depth processing method, an electronic device and a medium are provided. The depth processing method includes: obtaining a color image and a depth map corresponding to the color image; extracting a plurality of regions from at least one of the depth map and the color image; obtaining region information of the regions, and classifying the regions into at least one of a region-of-interest and a non-region-of-interest according to the region information, wherein the region information comprises area information and edge information; and adjusting a plurality of depth values in the depth map according to the region information.

30 Claims, 4 Drawing Sheets

Before    After(Bokeh)

METHOD, ELECTRONIC DEVICE AND MEDIUM FOR ADJUSTING DEPTH VALUES

CROSS-REFERENCE TO RELATED APPLICATION

This application claims the priority benefits of U.S. provisional application Ser. No. 61/904,467, filed on Nov. 15, 2013. The entirety of the above-mentioned patent applications is hereby incorporated by reference herein and made a part of this specification.

BACKGROUND

1. Technology Field

The invention relates to a depth processing method. More particularly, the invention relates to a method, an electronic device and a medium for adjusting depth values by using both a color image and a depth map.

2. Description of Related Art

It is getting easier to obtain digital images these days by photographic equipments. In some applications, depth information is taken to generate some vision effects, for example, bokeh or refocusing. In general, bokeh effect is used to focus on one object, so that the object is rendered clear while other objects in a distance would be rendered blurred. And, refocusing effect is to change the focal length after a digital image is acquired. However, the depth information is sometime inaccurate, that may generate a low quality image. For example, if depth information is obtained by using a left-eye-image and a right-eye-image, then the depth information may have some "depth holes", discontinuous depth values, or blurred boundary. Therefore, how to adjust depth values so as to provide pleasing vision effects has became one of the major subjects in the industry for person skilled in the art.

Nothing herein should be construed as an admission of knowledge in the prior art of any portion of the invention. Furthermore, citation or identification of any document in this application is not an admission that such document is available as prior art to the invention, or that any reference forms a part of the common general knowledge in the art.

SUMMARY

The invention is directed to a depth processing method, an electronic device, and a medium for adjusting depths and generating optical-like effects.

In an exemplary embodiment of the invention, a depth processing method for an electronic device is provided. The depth processing method includes: obtaining a depth map and a color image corresponding to the depth map; extracting a plurality of regions from at least one of the depth map and the color image; obtaining region information of the regions, and classifying the regions into at least one of a region-of-interest and a non-region-of-interest according to the region information, wherein the region information comprises area information and edge information; and adjusting a plurality of depth values in the depth map according to the region information.

In an exemplary embodiment of the invention, an electronic device is provided. The electronic device comprises a memory storing a plurality of instructions, and a processor for executing the instructions to perform the said steps.

In an exemplary embodiment of the invention, a non-transitory computer readable medium is provided. The non-transitory computer readable medium stores instructions which are configured to perform the said steps.

In view of the foregoing, according to the exemplary embodiments, the depth processing, the electronic device and the medium are capable of adjusting depth values after obtaining regions, and the adjustment is done by using both a depth map and a color image. As a result, the adjusted depth values may generate better vision effects.

It should be understood, however, that this Summary may not contain all of the aspects and embodiments of the invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
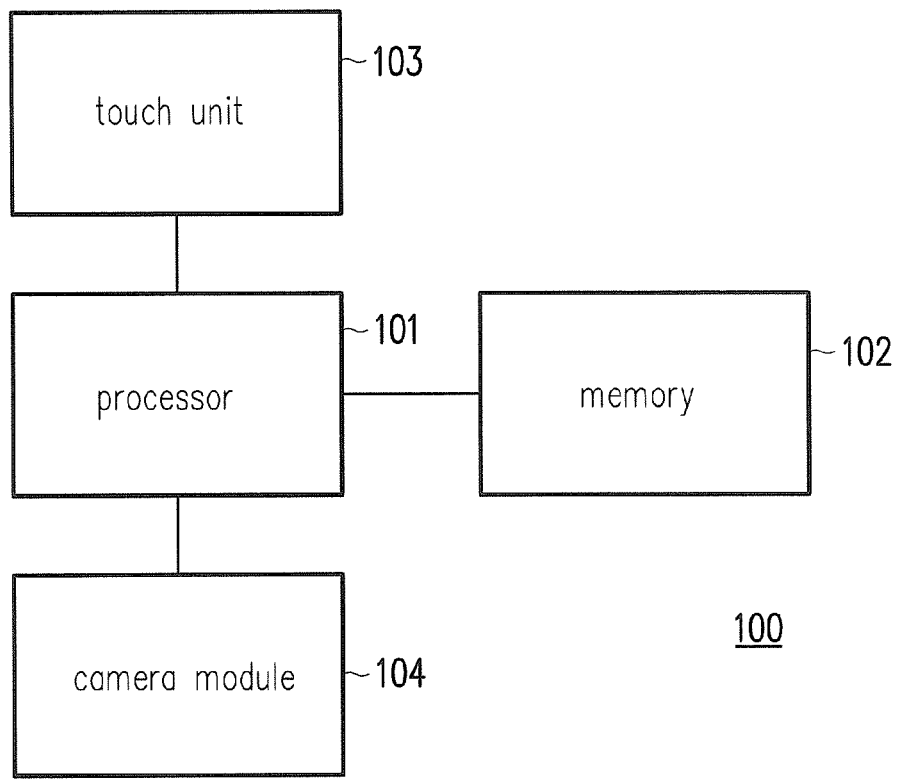
FIG. 1 illustrates an electronic device according to an exemplary embodiment of the invention.

FIG. 1 illustrates an electronic device according to an exemplary embodiment of the invention.

With reference to FIG. 1, an electronic device 100 includes a processor 101, a memory 102, a touch unit 103, and a camera module 104. The electronic device 100 may be implemented as a smart phone, a tablet, a notebook, a desktop or an embedded system in any form, which is not limited in the invention.

The processor 101 controls the overall operation of the electronic device 100. For example, the processor 101 may be a central processing unit (CPU), a microprocessor, a digital signal processor (DSP), a programmable controller, an application specific integrated circuits (ASIC), or a programmable logic device (PLD). The memory 102 is configured to store instructions. For example, the memory 102 may be, but not limited to, a random access memory (RAM) or a flash memory. In addition, the processor 101 executes the instructions in the memory 102 to perform a depth processing method.

The touch unit 103 is configured to detect a touch operation. For example, the touch unit 103 may include combinations of a liquid crystal display (LCD), a light-emitting diode (LED) display, a field emission display (FED) or the likes with a resistance-type, capacitive-type or any other type of touch sensing units, so that the functions of display and touch control may be provided simultaneously.

The camera module 104 is coupled to the processor 101. The camera module 104 may have a single camera sensor, dual camera sensor or multiple camera sensors. For dual camera sensors and multiple camera sensors, these sensors may be configured with the same resolution, or combinations of lower resolution sensor(s) and higher resolution sensor(s).

Figure 2:
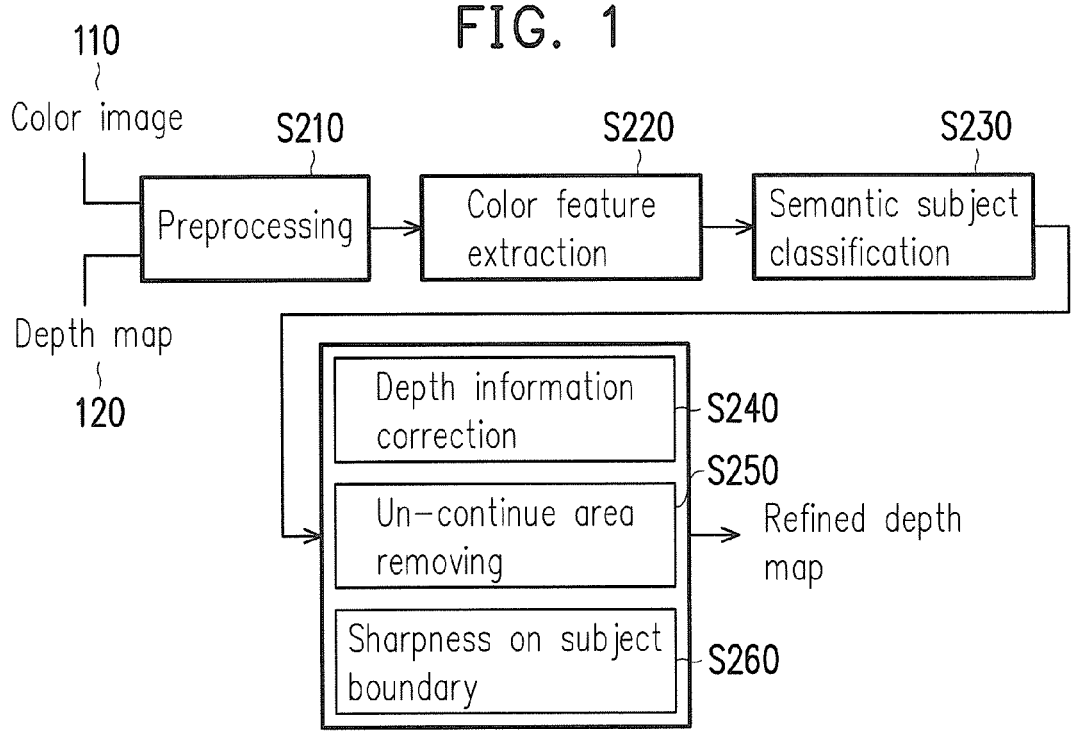
FIG. 2 illustrates a flowchart for adjusting depth values according to an exemplary embodiment of the invention.
Figure 3:
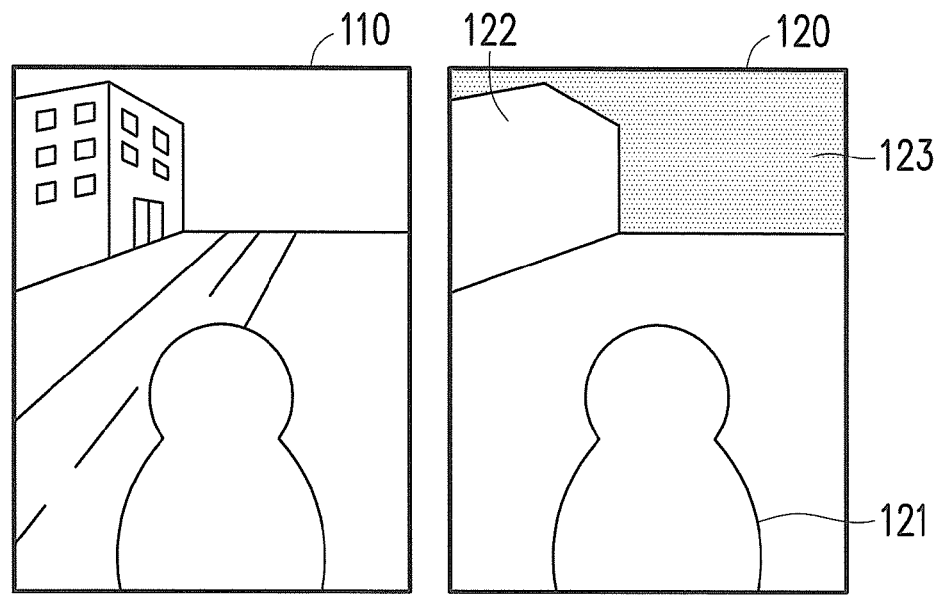
FIG. 3 is schematic diagrams illustrating a color image and a depth map according to an exemplary embodiment.
Figure 4:
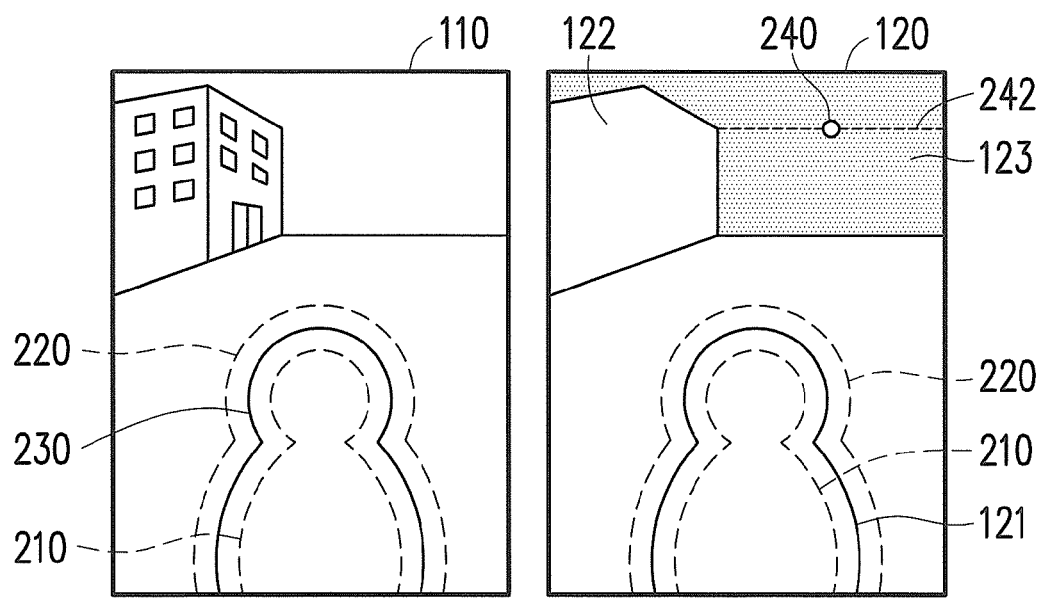
FIG. 4 is a schematic diagram illustrating the usage of boundaries to improve semantic subject classification according to an exemplary embodiment of the invention.

FIG. 2 illustrates a flowchart for adjusting depth values according to an exemplary embodiment of the invention. FIG. 3 is a schematic diagram illustrating a color image and a depth map according to an exemplary embodiment of the invention. FIG. 4 is a schematic diagram illustrating the usage of boundaries to improve semantic subject classification according to an exemplary embodiment of the invention. The steps of FIG. 2 could be implemented by the elements shown in FIG. 1. Besides, the details of each of the steps in FIG. 2 would be discussed with referring to FIG. 3 and FIG. 4.

Referring to FIG. 2 and FIG. 3, before step S210, the processor 101 first obtains a color image 110 and a depth map 120 corresponding to the color image 110. The color image 110 may be the image(s) captured by the camera module 104 having the single camera sensor, the dual camera sensor or the multiple camera sensors. The depth map 120 includes a plurality of depth values which can be generated by analysis of multiple color image of the camera module 104 or the camera module 104 with an infrared lens unit; alternatively, the depth values may be calculated by the processor 101 after receiving two color images, which is not limited in the disclosure. Then, in step S210, the processor 101 may perform a preprocessing procedure such as de-noise, erosion, dilation, or smoothing on the color image 110, the depth map 120 or both of them.

After the preprocessing procedure, in step S220, the processor 101 extracts some features from the color image 110. For example, pixel gradient, finding edge, segmentation, local/global feature, scale-invariant feature, rotation-invariant feature, a statistic information can be extracted from or performed on the color image 110. And, a clustering procedure, such as watershed algorithm, k-means algorithm or grab-cut algorithm, is performed on the color image 110. However, other supervised/un-supervised, or interactive/non-interactive clustering approaches may also be used, which should not be construed as limitations to the disclosure. In another embodiment, the feature extraction and the clustering procedure may also be performed on the depth map 120. After the clustering method, the color image 110, the depth map 120, or both of them are divided into a plurality of regions. In some exemplary embodiments, the regions may be a cluster of pixels with similar colors and/or a group of pixels surrounding by a specific contour, but the invention is not limited thereto.

The processor 101 may define the regions according to various algorithms. For example, if the processor 101 executes a clustering algorithm to define the regions in the color image 110, the defined regions may be clusters which respectively include pixels with similar colors. If the processor 101 executes an edge detection algorithm to define the regions in the depth map 120, the defined regions may be clusters which respectively being surrounded by a specific contour.

Then, the processor 101 obtains region information of the regions, and classifies the regions into a region-of-interest (ROI) or a non-region-of-interest (non-ROI) according to the region information. In some embodiments, the region information may include area information and edge information, and the processor 101 may obtain the area information and the edge information during executing the clustering algorithm and/or the edge detection algorithm. For example, while the processor 101 executes the clustering algorithm to define the regions in the color image 110, the area information (such as the coordinates of the pixels locating in each of the regions) may also be obtained. Similarly, while the processor 101 executes the edge detection algorithm to define the regions in the depth map 120, the edge information (such as the coordinates of the pixels locating on the contour of each region) may also be obtained. However, the area information and the edge information may be obtained from the color image 110 or the depth map 120 by any other image processing approach, which is not limited in the invention. Afterwards, the processor 101 adjusts the depth values in the depth map 120 according to the region information. For example, if the processor 101 finds out there exists a depth hole in one of the region according to the edge information (e.g., the coordinates of the pixels locating on the contour of this region), the processor 101 may fill the depth hole in this region, or sharpen the boundaries of the regions, but the invention does not limit how to adjust the depth values according to the region information.

Semantic Subject Classification (Step S230)

To be more specific, when classifying the regions, the processor 101 may perform a classification procedure on the regions or the pixels in the color image 110, the depth map 120, or both of them. The result of the classification procedure would indicate whether a region is ROI or non-ROI. For example, Otsu algorithm is performed both on the pixels in the depth map 120 and the regions in the color image 110. Note that the Otsu algorithm may be performed several times to get a plurality of layers. However, other supervised/un-supervised classification procedures may be used in another embodiment, which should not be construed as limitations to the disclosure. In one exemplary embodiment, the regions in the color image 110 are referred as color regions which indicate color values inside this color region are similar or same, and the regions in the depth map 120 are referred as depth regions which indicate depth values inside this depth region are similar or same. A size, a location, or a depth of each depth region can be used when classifying depth regions. Basically, a depth region with larger size, at center of the image, or smaller depth (closer to the camera) has a higher probability to be considered as ROI. In particular, the information of size, location and depth may also be combined in one exemplary embodiment. For example, three classification procedures are performed based on size, location and depth, and each classification procedure may vote to each region, that is, give a score to each region, where each score represents a probability that a region is ROI. The scores of each region are summed, and the summed score of each region are compared with a threshold to determine if the region is ROI. However, the disclosure is not limited thereto, in another embodiment, the union or intersection of the classification results calculated by different classification procedures may be taken to classify the regions.

After the classification procedure, in FIG. 4, a region 121 is ROI, and regions 122 and 123 are non-ROI. The clustering results from the color image 110 and the depth map 120 may also be combined to improve accuracy. For example, Referring to FIG. 4, the processor 101 performs an erosion procedure on the region 121 (also referred as a first depth region) to get a boundary 210, and performs a dilation procedure on the region 121 to get a boundary 220. The boundaries 210 and 220 are mapped into the color image 110, and a segmentation algorithm is performed in the area between the boundaries 210 and 220 in the color image 110 for adjusting a contour of the region 121. For example, the segmentation algorithm is a watershed algorithm, which would separate the area between the boundary 210 and boundary 220 in the color image 110 into two sub-areas, and the boundary between these two sub-areas would become a smoother contour of the region 121.

Depth Information Correction (Step S240)

The depth map 120 may have some depth holes or some incorrect depth values, and these depth holes or depth values can be fixed based on the classified region. In the exemplary embodiment, different classified regions are treated with different correcting methods. When filling depth holes in ROI, information on pixel domain or region domain can be used. For example, a pixel in a depth hole can be filled by a statistic value (such as mean or median depth) of nearby pixels, by a statistic value of its region, a statistic value of neighboring regions, or a statistic value of all ROI.

For the depth holes in the non-ROI, the background depth information is complicated since it has variety of scenes from indoor or outdoor environments. In addition, different statistic model can be applied according to the characteristic of background depth information.

For example, assume there is a depth hole 240 in the background region 123. In one embodiment, the processor 101 may scan the depth values on the horizontal line 242 to build a depth histogram or a statistic model and accordingly fill the depth hole 240. Specifically, the processor 101 may find out whether there exist some depth values which are obviously deviating from nearby depth values, i.e., the depth holes. If yes, the processor 101 may fill the depth holes by replacing the depth values related to the depth holes with the mean, median or other statistic values of the nearby depth values.

In an embodiment, for dealing with a large variety of depth values in the non-ROI, the processor 101 may use multi-scaled region based statistical estimator to fix up the various depth holes existing in the depth map. The processor 101 may define the multi-scaled region by any shape to fit the depth distribution of the depth map. For example, the processor 101 may develop a large-scaled region to fuse the information of global variation of the depth map and fill the large-sized depth holes. Meanwhile, the processor 101 may develop a small-scaled region to fill the small-sized depth holes with a local statistical sense. As a result, the processor 101 may cope with the depth holes with multi-resolution.

In another embodiment, a plurality of valid depth values in a search range of the depth hole 240 are obtained to fill the depth hole 240. Specifically, when the processor 101 determines a selected pixel is a depth hole, the processor 101 may expand a search range from the depth hole on multi-direction and multi-scale to search neighboring pixels for finding out other valid depth values. From other point of view, the search range may be regarded as being expanded in a ripple way for searching valid depth values. Afterwards, the processor 101 may use the valid depth values to fill the depth holes.

Un-Continue Area Removing (Step S250)

The original depth map 120 may contain incorrect values, and some of them can be corrected according to the semantic region. For example, if the region 121 inside has a depth value same as a background region, the depth value in the region 121 could be wrong; therefore they are replaced by the depth values in the region 121. To be specific, the processor executes an object detection procedure on the color image 110 to detect that the region 230 is corresponding to an object. An object area of the object is mapped into the depth map (become region 121). Since the depth values in the region 121 belong to the same object, they should be continuous. Therefore, a discontinuous depth value in the region 121 (i.e., the object area of the object) is adjusted according to the depth values in the region 121; or a depth hole in the region 121 is filled according to the depth values in the region 121 (e.g. by a low pass filter or replaced by other depth values). Note that the object detection may be a human detection, vehicle detection, a pedestrian detection, or any other object detection, which should not be limited in the invention. In addition, the adjustment or filling of the depth values can be done by a filter, a statistic approach, a pattern recognition model, or replacement, which should not be construed as limitations to the disclosure.

Object Boundary Sharpness (Step S260)

Next, edges or boundaries in the color image 110 are used to sharpen the edges or the boundaries in the depth map 120. For example, a high-pass filter could be applied on the depth map 120 according to the locations of edges or boundaries in the color image 110. Consequently, the boundary between ROI and non-ROI in the depth map 120 is clearer. At last, a refined depth map is obtained (see FIG. 2).

Range Selection

Figure 5:
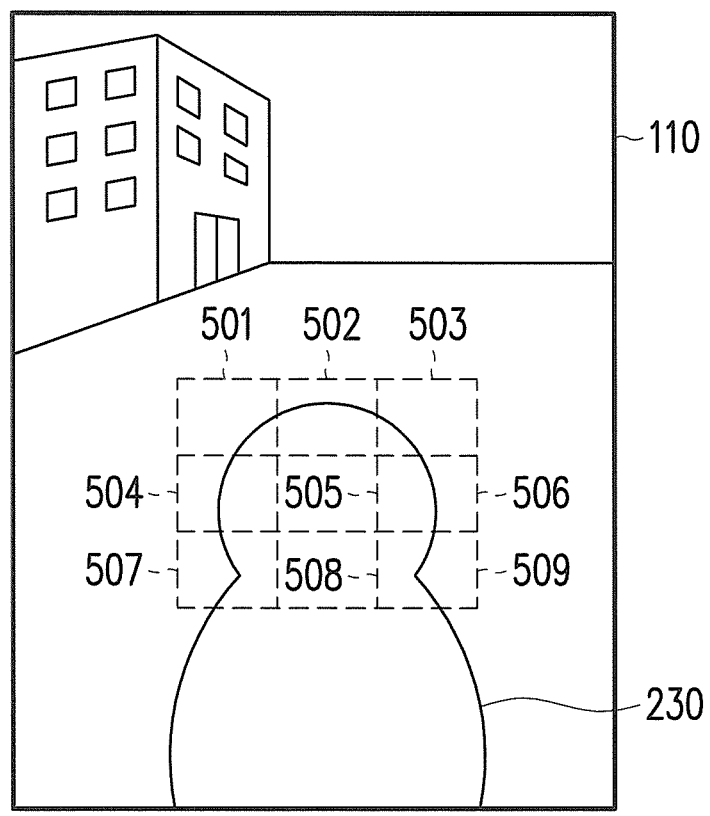
FIG. 5 illustrates a range selection according to an exemplary embodiment of the invention.

FIG. 5 illustrates range selection according to an exemplary embodiment of the invention. When a user takes a photo, at least one ROI is automatically detected according to the steps discussed above, and one ROI is selected as a target object. A focal length would be on the target object, that is, the focal length is equal to the depth value of the target object. As a result, the target object is rendered clearly, while other objects may be blurred. However, the user may choose another object as the target object. In one embodiment, the color image 110 is rendered on the display of touch unit 103, and a touch operation is detected on the touch unit 103. A touch range (e.g. 40×40 pixels rectangle) is obtained according to the touch operation, and the new focal length is calculated according to the depth values in the touch range. For example, with reference with FIG. 5, a user touches the touch range 505. The processor 101 calculates a variance of the depth values in the touch range 505, where the depth values smaller than a first predetermined depth value and greater than a second predetermined depth value are selected for calculating the variance. In other words, depth values in the touch range 505 which are greater than the first threshold or smaller than the second threshold are discarded when calculating the variance. If the variance is smaller than a threshold, a statistic value (e.g. mean or median) of the remainder depth values in the touch region 505 is set as the focal length. On the other hand, if the variance is greater than the third threshold, the processor 101 obtains neighboring range 501~504, and 506~509 next to the touch range 505, and setting a focal length according to the depth values in one of the neighboring ranges which has smallest variance. To be specific, the same calculations of threshold and variance discussed above are performed on each of the neighboring ranges 501~504 and 506~509. In one exemplary embodiment, the neighboring range which has the smallest variance would be selected. In another exemplary embodiment, the neighboring range having the smallest depth value (closest to the camera) is selected, or the one having the most similar depth values with the touch region 505 is selected. However, these selection criteria can be combined via voting, weighting or any other way, which is not limited in the disclosure. Then, the depth values in the selected neighboring range are used to calculate the focal length.

Progressive Bokeh Effect

Figure 6:
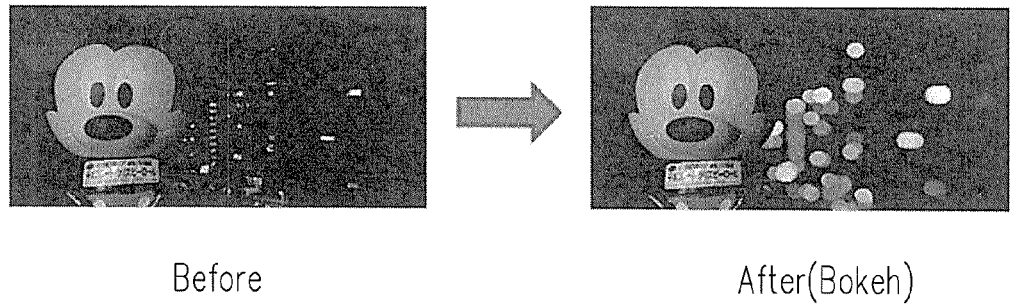
FIG. 6 is a schematic diagram illustrating an original image and a bokeh image according to an exemplary embodiment of the invention.

After the focal length is obtained, a bokeh image can be generated (see FIG. 6). To be specific, depth differences between the obtained focal length and the other depth values in the depth image 120 are calculated, and a plurality of strengths are set according to the depth differences. In one embodiment, the relationship between the depth difference and the strength is defined by a function. The function could be linear, polynomial, exponential, or any type of function, which is not limited in the disclosure. Convolution is performed on the color image 110 according to the strength such that larger depth difference will lead to more blurred image. Consequently, the object the user selects is rendered clear, while other objects far from the selected object are rendered blurred to generate a bokeh effect.

Figure 7:
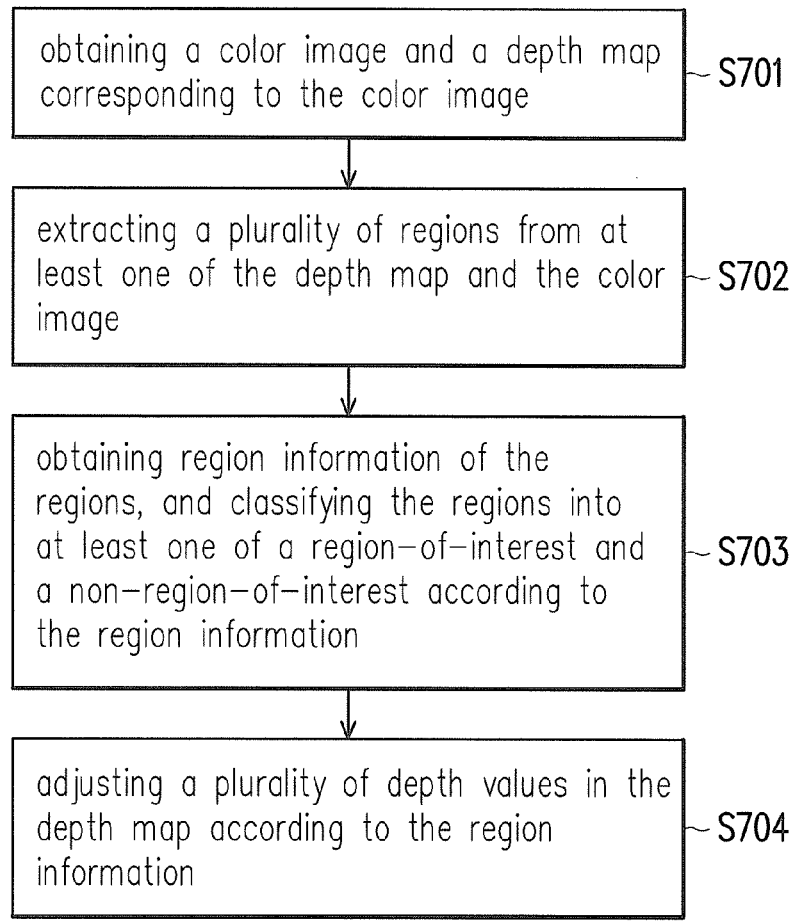
FIG. 7 illustrates a flowchart of a depth process method according to an exemplary embodiment of the invention.

FIG. 7 illustrates a flowchart of a depth process method according to an exemplary embodiment of the invention.

Referring to FIG. 7, a color image and a depth map corresponding to the color image are obtained in step S701. A plurality of regions from at least one of the depth map and the color image are extracted in step S702. Region information of the regions is obtained, and the regions are classified into a region-of-interest or a non-region-of-interest according to the region information in step S703. A plurality of depth values in the depth map are adjusted according to the region information in step S704. Each step shown in FIG. 7 is elaborated above and will no longer be described hereinafter. Note that the steps provided in FIG. 7 may be implemented in form of programming codes or circuits, which should not be construed as a limitation to the invention. In addition, the methods provided in FIG. 7 may be applied with reference to the previous embodiments or may be individually applied, and the invention is not limited thereto.

One exemplary embodiment of the invention also provides a non-transitory computer readable medium, which may be implemented as the form of memory 102, a disk, or a CD. The non-transitory computer readable medium stores a plurality of instruction executed by the processor 101 so as to execute the depth processing method described above.

To sum up, according to the depth processing method, the electronic device, and the non-transitory computer readable medium described in the exemplary embodiments of the invention, depth values are adjusted with the usage of both the color image and the depth map. Therefore, the depth values are refined so as to generate better vision effect.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A depth processing method for an electronic device, the depth processing method comprising:
   obtaining a color image and a depth map corresponding to the color image;
   extracting a plurality of regions from at least one of the depth map and the color image;
   obtaining region information of the regions, and classifying the regions into at least one of a region-of-interest and a non-region-of-interest according to the region information, wherein the region information comprises area information and edge information; and
   adjusting a plurality of depth values in the depth map according to the region information,
   wherein the regions comprises a plurality of color regions and a plurality of depth regions, the depth regions are obtained from the depth map, and a first color region of the color regions corresponds to a first depth region of the depth regions, wherein the step of adjusting the depth values in the depth map according to the region information comprises:
      performing an erosion procedure on the first depth region to obtain a first boundary;
      performing a dilation procedure on the first depth region to obtain a second boundary; and
      mapping the first boundary and the second boundary into the color image, and performing a segmentation algorithm in an area between the first boundary and the second boundary in the color image for adjusting a contour of the first depth region.

2. The depth processing method as recited in claim 1, wherein the step of classifying the regions into at least one of the region-of-interest and the non-region-of-interest according to the region information comprises:
   classifying the depth regions into the region-of-interest or the non-region-of-interest according to at least one of a size, a depth, a location of each of the depth regions.

3. The depth processing method as recited in claim 2, further comprising:
   executing an object detection procedure on the color image to obtain an object; and
   mapping an object area of the object into the depth map, and filling a depth hole in the object area of the object in the depth map according to the depth values in the object area of the object in the depth map.

4. The depth processing method as recited in claim 3, further comprising:
   adjusting a discontinuous depth value in the object area of the object in the depth map according to the depth values in the object area of the object in the depth map.

5. The depth processing method as recited in claim 1, wherein the area information is obtained by performing a clustering algorithm on the color image.

6. The depth processing method as recited in claim 1, wherein the edge information is obtained by performing an edge detection algorithm on the color image.

7. The depth processing method as recited in claim 1, wherein the electronic device comprises a touch unit, and the depth processing method comprises:
   detecting a touch operation on the touch unit;
   obtaining a touch range according to the touch operation;
   calculating a variance of the depth values in the touch range, wherein the depth values smaller than a first predetermined depth value and greater than a second predetermined depth value are selected for calculating the variance; and
   if the variance is greater than a threshold, obtaining a plurality of neighboring range next to the touch range, and setting a focal length according to the depth values in one of the neighboring ranges which has smallest variance.

8. An electronic device, comprising:
   a memory, storing a plurality of instructions; and
   a processor, coupled to the memory, and configured to execute the instructions to perform a plurality of steps:
      obtaining a color image and a depth map corresponding to the color image;
      extracting a plurality of regions from at least one of the depth map and the color image;
      obtaining region information of the regions, and classifying the regions into at least one of a region-of-interest and a non-region-of-interest according to the region information, wherein the region information comprises area information and edge information; and
      adjusting a plurality of depth values in the depth map according to the region information,
   wherein the regions comprises a plurality of color regions and a plurality of depth regions, the depth regions are obtained from the depth map, a first color region of the color regions corresponds to a first depth region of the depth regions, and the step of adjusting the depth values in the depth ma according to the region information comprises:
  performing an erosion procedure on the first depth region to obtain a first boundary;
  performing a dilation procedure on the first depth region to obtain a second boundary; and
  mapping the first boundary and the second boundary into the color image, and performing a segmentation algorithm in an area between the first boundary and the second boundary in the color image for adjusting a contour of the first depth region.

9. The electronic device as recited in claim 8, wherein the step of classifying the regions into at least one of the region-of-interest and the non-region-of-interest according to the region information comprises:
  classifying the depth regions into the region-of-interest or the non-region-of-interest according to at least one of a size, a depth, a location of each of the depth regions.

10. The electronic device as recited in claim 9, wherein the steps further comprises:
  executing an object detection procedure on the color image to obtain an object; and
  mapping an object area of the object into the depth map, and filling a depth hole in the object area of the object in the depth map according to the depth values in the object area of the object in the depth map.

11. The electronic device as recited in claim 8, further comprising a touch unit, and the steps further comprising:
  detecting a touch operation on the touch unit;
  obtaining a touch range according to the touch operation;
  calculating a variance of the depth values in the touch range, wherein the depth values smaller than a first predetermined depth value and greater than a second predetermined depth value are selected for calculating the variance; and
  if the variance is greater than a threshold, obtaining a plurality of neighboring range next to the touch range, and setting a focal length according to the depth values in one of the neighboring ranges which has smallest variance.

12. A non-transitory computer readable medium, for storing a plurality of instructions, and the instructions are configured to perform a plurality of steps:
  obtaining a color image and a depth map corresponding to the color image;
  extracting a plurality of regions from at least one of the depth map and the color image;
  obtaining region information of the regions, and classifying the regions into at least one of a region-of-interest and a non-region-of-interest according to the region information, wherein the region information comprises area information and edge information; and
  adjusting a plurality of depth values in the depth map according to the region information,
  wherein the regions comprises a plurality of color regions and a plurality of depth regions, the depth regions are obtained from the depth map, a first color region of the color regions corresponds to a first depth region of the depth regions, and the step of adjusting the depth values in the depth map according to the region information comprises:
    performing an erosion procedure on the first depth region to obtain a first boundary;
    performing a dilation, procedure on the first depth region to obtain a second boundary; and
    mapping the first boundary and the second boundary into the color image, and performing a segmentation algorithm in an area between the first boundary and the second boundary in the color image for adjusting a contour of the first depth region.

13. The non-transitory computer readable medium as recited in claim 12, wherein the step of classifying the regions into at least one of the region-of-interest and the non-region-of-interest according to the region information comprises:
  classifying the depth regions into the region-of-interest or the non-region-of-interest according to at least one of a size, a depth, a location of each of the depth regions.

14. The non-transitory computer readable medium as recited in claim 13, wherein the steps further comprises:
  executing an object detection procedure on the color image to obtain an object; and
  mapping an object area of the object into the depth map, and filling a depth hole in the object area of the object in the depth map according to the depth values in the object area of the object in the depth map.

15. The non-transitory computer readable medium as recited in claim 12, wherein the steps further comprises:
  detecting a touch operation on a touch unit;
  obtaining a touch range according to the touch operation;
  calculating a variance of the depth values in the touch range, wherein the depth values smaller than a first predetermined depth value and greater than a second predetermined depth value are selected for calculating the variance; and
  if the variance is greater than a threshold, obtaining a plurality of neighboring range next to the touch range, and setting a focal length according to the depth values in one of the neighboring ranges which has smallest variance.

16. A depth processing method for an electronic device, wherein the electronic device comprises a touch unit, and the depth processing method comprising:
  obtaining a color image and a depth map corresponding to the color image;
  extracting a plurality of regions from at least one of the depth map and the color image;
  obtaining region information of the regions, and classifying the regions into at least one of a region-of-interest and a non-region-of-interest according to the region information, wherein the region information comprises area information and edge information;
  adjusting a plurality of depth values in the depth map according to the region information;
  detecting a touch operation on the touch unit;
  obtaining a touch range according to the touch operation;
  calculating a variance of the depth values in the touch range, wherein the depth values smaller than a first predetermined depth value and greater than a second predetermined depth value are selected for calculating the variance; and
  if the variance is greater than a threshold, obtaining a plurality of neighboring range next to the touch range, and setting a focal length according to the depth values in one of the neighboring ranges which has smallest variance.

17. The depth processing method as recited in claim 16, wherein the regions comprises a plurality of color regions and a plurality of depth regions, the depth regions are obtained from the depth map, and the step of classifying the regions into at least one of the region-of-interest and the non-region-of-interest according to the region information comprises:

classifying the depth regions into the region-of-interest or the non-region-of-interest according to at least one of a size, a depth, a location of each of the depth regions.

18. The depth processing method as recited in claim 17, wherein a first color region of the color regions corresponds to a first depth region of the depth regions, and the step of adjusting the depth values in the depth map according to the region information comprises:
performing an erosion procedure on the first depth region to obtain a first boundary;
performing a dilation procedure on the first depth region to obtain a second boundary; and
mapping the first boundary and the second boundary into the color image, and performing a segmentation algorithm in an area between the first boundary and the second boundary in the color image for adjusting a contour of the first depth region.

19. The depth processing method as recited in claim 17, further comprising:
executing an object detection procedure on the color image to obtain an object; and
mapping an object area of the object into the depth map, and filling a depth hole in the object area of the object in the depth map according to the depth values in the object area of the object in the depth map.

20. The depth processing method as recited in claim 19, further comprising:
adjusting a discontinuous depth value in the object area of the object in the depth map according to the depth values in the object area of the object in the depth map.

21. The depth processing method as recited in claim 16, wherein the area information is obtained by performing a clustering algorithm on the color image.

22. The depth processing method as recited in claim 16, wherein the edge information is obtained by performing an edge detection algorithm on the color image.

23. An electronic device, comprising:
a memory, storing a plurality of instructions;
a processor, coupled to the memory; and
a touch unit,
wherein the processor is configured to execute the instructions to perform a plurality of steps:
obtaining a color image and a depth map corresponding to the color image;
extracting a plurality of regions from at least one of the depth map and the color image;
obtaining region information of the regions, and classifying the regions into at least one of a region-of-interest and a non-region-of-interest according to the region information, wherein the region information comprises area information and edge information;
adjusting a plurality of depth values in the depth map according to the region information;
detecting a touch operation on the touch unit;
obtaining a touch range according to the touch operation;
calculating a variance of the depth values in the touch range, wherein the depth values smaller than a first predetermined depth value and greater than a second predetermined depth value are selected for calculating the variance; and
if the variance is greater than a threshold, obtaining a plurality of neighboring range next to the touch range, and setting a focal length according to the depth values in one of the neighboring ranges which has smallest variance.

24. The electronic device as recited in claim 23, wherein the regions comprises a plurality of color regions and a plurality of depth regions, the depth regions are obtained from the depth map, and the step of classifying the regions into at least one of the region-of-interest and the non-region-of-interest according to the region information comprises:
classifying the depth regions into the region-of-interest or the non-region-of-interest according to at least one of a size, a depth, a location of each of the depth regions.

25. The electronic device as recited in claim 24, wherein a first color region of the color regions corresponds to a first depth region of the depth regions, and the step of adjusting the depth values in the depth map according to the region information comprises:
performing an erosion procedure on the first depth region to obtain a first boundary;
performing a dilation procedure on the first depth region to obtain a second boundary; and
mapping the first boundary and the second boundary into the color image, and performing a segmentation algorithm in an area between the first boundary and the second boundary in the color image for adjusting a contour of the first depth region.

26. The electronic device as recited in claim 24, wherein the steps further comprises:
executing an object detection procedure on the color image to obtain an object;
mapping an object area of the object into the depth map, and filling a depth hole in the object area of the object in the depth map according to the depth values in the object area of the object in the depth map.

27. A non-transitory computer readable medium, for storing a plurality of instructions, and the instructions are configured to perform a plurality of steps:
obtaining a color image and a depth map corresponding to the color image;
extracting a plurality of regions from at least one of the depth map and the color image;
obtaining region information of the regions, and classifying the regions into at least one of a region-of-interest and a non-region-of-interest according to the region information, wherein the region information comprises area information and edge information;
adjusting a plurality of depth values in the depth map according to the region information;
detecting a touch operation on a touch unit;
obtaining a touch range according to the touch operation;
calculating a variance of the depth values in the touch range, wherein the depth values smaller than a first predetermined depth value and greater than a second predetermined depth value are selected for calculating the variance; and
if the variance is greater than a threshold, obtaining a plurality of neighboring range next to the touch range, and setting a focal length according to the depth values in one of the neighboring ranges which has smallest variance.

28. The non-transitory computer readable medium as recited in claim 27, wherein the regions comprises a plurality of color regions and a plurality of depth regions, the depth regions are obtained from the depth map, and the step of classifying the regions into at least one of the region-of-interest and the non-region-of-interest according to the region information comprises:
classifying the depth regions into the region-of-interest or the non-region-of-interest according to at least one of a size, a depth, a location of each of the depth regions.

29. The non-transitory computer readable medium as recited in claim 28, wherein a first color region of the color regions corresponds to a first depth region of the depth regions, and the step of adjusting the depth values in the depth map according to the region information comprises:
- performing an erosion procedure on the first depth region to obtain a first boundary;
- performing a dilation procedure on the first depth region to obtain a second boundary; and
- mapping the first boundary and the second boundary into the color image, and performing a segmentation algorithm in an area between the first boundary and the second boundary in the color image for adjusting a contour of the first depth region.

30. The non-transitory computer readable medium as recited in claim 28, wherein the steps further comprises:
- executing an object detection procedure on the color image to obtain an object; and
- mapping an object area of the object into the depth map, and filling a depth hole in the object area of the object in the depth map according to the depth values in the object area of the object in the depth map.

* * * * *